United States Patent [19]

Jensen et al.

[11] 4,274,919
[45] Jun. 23, 1981

[54] SYSTEMS FOR MERGING OF TOROIDAL PLASMAS

[75] Inventors: Torkil H. Jensen, Del Mar; Nobuyoshi Ohyabu, La Jolla; Chung-Lih Hsieh, San Diego, all of Calif.

[73] Assignee: General Atomic Company, San Diego, Calif.

[21] Appl. No.: 851,431

[22] Filed: Nov. 14, 1977

[51] Int. Cl.² ............................................. G21B 21/00
[52] U.S. Cl. ........................................ 176/3; 176/9; 176/5
[58] Field of Search ............................. 176/1, 3, 5, 9

[56] References Cited

U.S. PATENT DOCUMENTS

| | | | |
|---|---|---|---|
| 2,992,345 | 7/1961 | Hansen | 176/5 |
| 3,039,014 | 6/1962 | Chang | 176/7 |
| 3,096,269 | 7/1963 | Halbach et al. | 176/7 |
| 3,156,621 | 11/1964 | Josephson | 176/1 |
| 3,338,789 | 8/1967 | Fink | 176/5 |
| 3,418,206 | 12/1968 | Hall et al. | 176/5 |
| 3,523,209 | 8/1970 | Ohkawa et al. | 176/5 |
| 3,624,443 | 11/1971 | Hammel | 176/5 |
| 3,663,361 | 5/1972 | Yoshikawa | 176/3 |
| 3,728,217 | 4/1973 | Dandl | 176/3 |

Primary Examiner—Samuel W. Engle
Assistant Examiner—S. A. Cangialosi
Attorney, Agent, or Firm—Fitch, Even, Tabin, Flannery & Welsh

[57] ABSTRACT

Methods and apparatus for merging of tokamak plasmas, having applications including pseudo steady-state tokamak operation, refueling, impurity removal and plasma heating. In such systems, currents of two merging tokamak plasmas are provided in the same direction so that the plasma columns attract each other, and the merging of the plasmas is carried out under the control of appropriate guiding fields.

7 Claims, 12 Drawing Figures

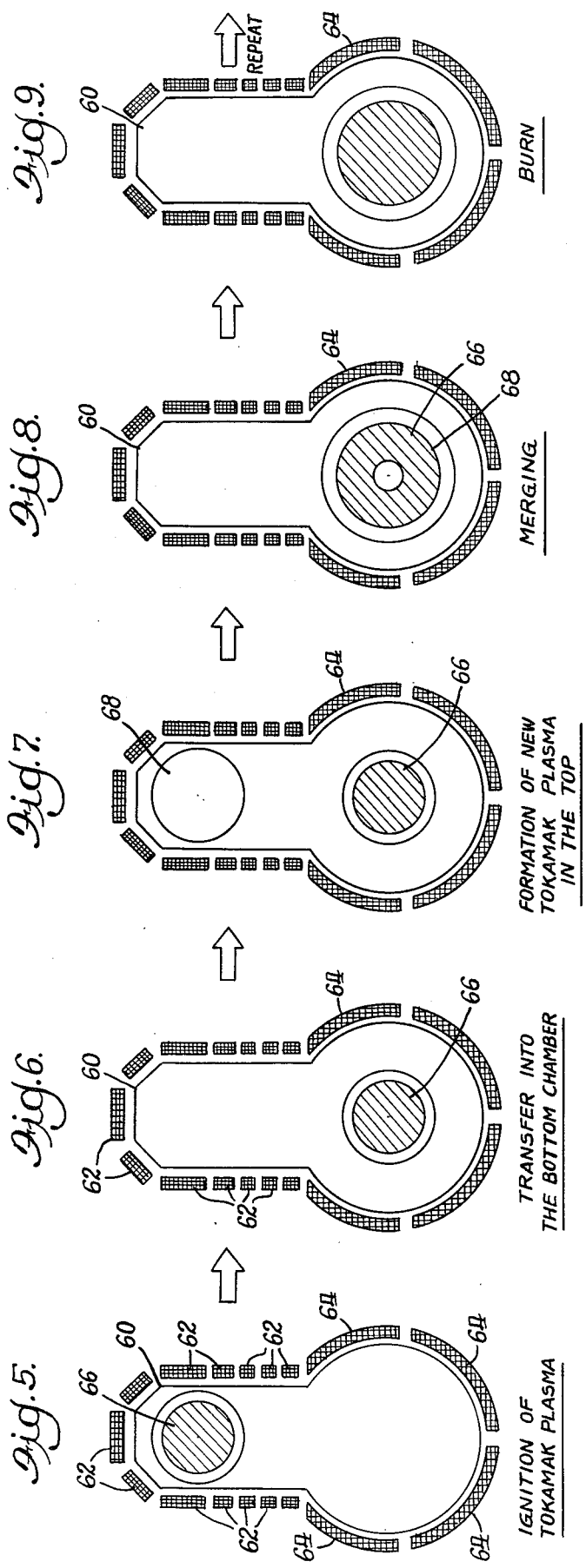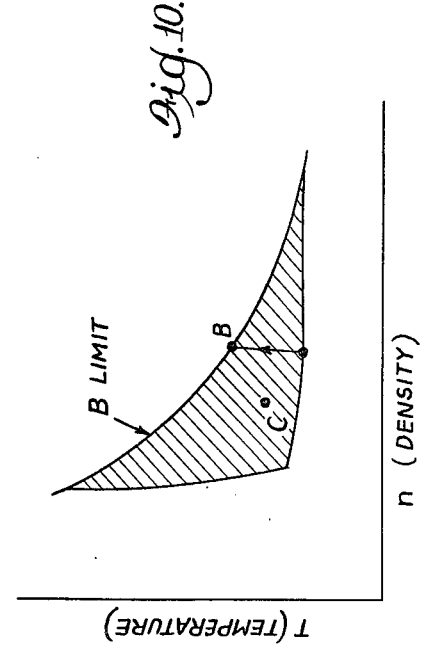

SYSTEMS FOR MERGING OF TOROIDAL PLASMAS

The present invention is directed to methods and apparatus for confining and controlling plasmas, and more particularly, to such methods and apparatus involving high temperature toroidal plasmas.

Various methods and apparatus have been developed for generating and confining plasmas, which are ionized gases comprising approximately equal numbers of positively charged ions and free electrons at high temperatures.

One general type of device for plasma confinement comprises an endless, closed tube, such as a toroid, with a geometrically co-extensive, externally imposed magnetic field (e.g., a toroidal magnetic field) in which magnetic lines of induction extend around the toroid generally parallel to its minor axis. Such a magnetic field is conventionally provided by electrical currents in one or more conductive coils encircling the minor axis of the toroid. Illustrative of such devices are the toroidal diffuse pinch plasma confinement devices of the Tokamak configuration, and such devices may be generally referred to hereinafter as tokamak devices or systems. The toroidal configuration may be advantageously employed with plasmas and plasma confinement systems or noncircular cross-section either with respect to planes perpendicular to the minor axis or the major axis such as those involving plasma configurations which are axisymmetrically elongated in a direction parallel to the major toroidal axis. In this connection, U.S. Pat. Nos. 3,692,626 and 3,801,438 illustrate plasma generation and confinement apparatus of the toroidal type having a noncircular cross-section in respect of a plane parallel to and intercepting the major toroidal axis.

As previously indicated, toroidal systems for the containment of high-temperature plasmas comprise means for providing a strong, toroidal magnetic field in which the plasma is to be embedded, and which is conventionally provided by electrical current in one or more conductive coils encircling the minor toroidal axis. The term "axis" is used herein to include multiple axes or axial surfaces, such that reference to toroidal systems may include such systems having a non-circular cross-section such as utilized in the various Doublet devices of the assignee of the present invention [Fisher, R. K., et al., GA-A14146 (1976)]. Toroidal plasma systems which are hereinafter generally referred to as tokamak systems, may also comprise means for providing a toroidal electric field to produce a current flowing in the plasma, generally in the direction of the minor axis, and this plasma current in turn may generate a magnetic field component which is poloidal (i.e., the magnetic flux lines are closed about the minor toroidal axis). The combination of the poloidal magnetic field produced by the plasma current, with the toroidal magnetic field produced by the toroidal coil current, is suitable for providing helix-like magnetic field lines that generally lie on closed, nested magnetic surfaces. The plasma is accordingly subjected to confining, constricting forces generated, at least in part, by the current flowing in the plasma. The resulting magnetic field provides for a diffused pinching force in the confining magnetic field which may be substantially greater than the outward pressure of the plasma.

The generation of a current in the plasma may conventionally be provided in various ways, such as by providing current in an inductive primary coil configured such that the plasma serves as the secondary coil of a transformer system. Such inductive current further provides for inductive, ohmic heating of the plasma, and systems for more continuous heating of tokamak plasmas have been proposed. However, conventional heating systems are not fully satisfactory in all respects and new systems for providing additional plasma heating would be desirable.

Steady-state or quasi steady-state operation of toroidal plasma systems is a recognized goal in the development of plasma technology and substantial effort in the art has been directed to non-inductive methods which might provide the capability for steady-state operation.

However, despite advances in respect of steady-state plasma heating, the injection of fuel into a tokamak plasma system represents a substantial problem in plasma system development for steady-state or quasi steady-state operation.

One way to accomplish plasma injection in a toroidal plasma system would be through the merging of separate plasmas, and such merging if appropriately carried out could also be utilized to provide additional benefit such as plasma heating and impurity removal.

Accordingly, it is an object of the present invention to provide improved methods and apparatus for merging of plasmas. These and other objects of the invention will be apparent from the following detailed description and the accompanying drawings, of which:

FIGS. 5–9 are cross-sectional illustrations of a superconducting coil plasma chamber illustrating a plasma merging sequence in the chamber;

FIG. 10 is a graphical representation in NT space of the plasma merging sequence of FIGS. 5–9;

Generally in accordance with the present invention, at least two plasmas are provided with currents in the same direction within a vacuum chamber. In this connection, it has been shown in the Doublet IIA experiments [Fisher, R. K., et al., GA-A14146 (1976)] that a plurality of toroidal plasmas may be provided which are separated by vacuum (so-called Droplets) or which are partially merged (so-called Doublets or higher multiplets).

Figure 1:
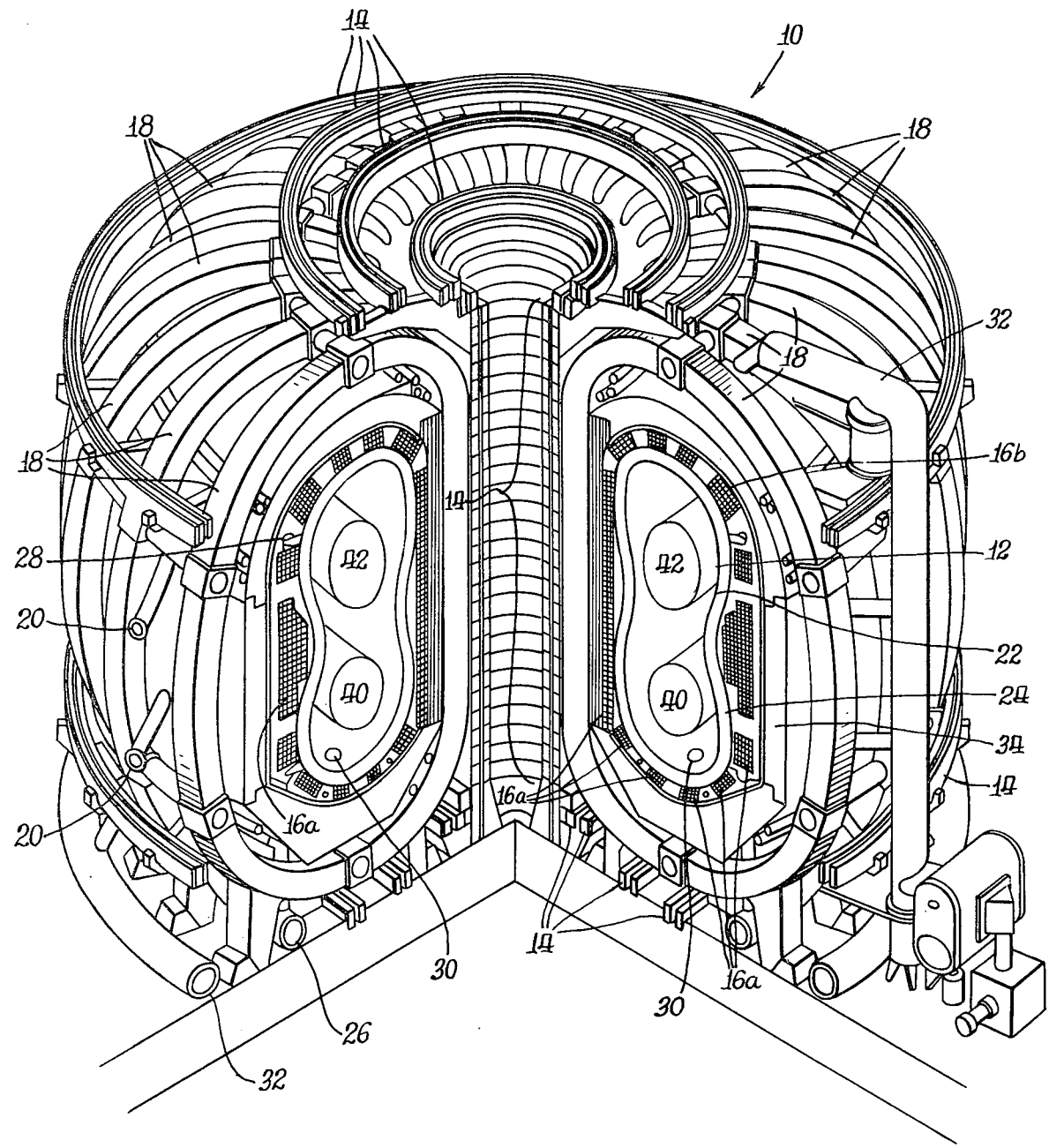
FIG. 1 is a perspective view of toroidal plasma generation and confinement apparatus illustrating various aspects of the present invention.

Two or more toroidal plasmas of the tokamak type with the same axis of symmetry and currents in the same direction attract each other, and such plasmas may be formed in the same vacuum chamber and merged into a lesser number of toroidal plasmas at a desired time by means of an appropriate poloidal coil system about the vacuum chamber. Moreover, as will be described in more detail, an appreciable amount of heating may accompany the merging process, and the process may be utilized to control current density profiles of the plasma system. The toroidal plasmas which are to be merged may be provided by appropriate toroidal plasma generation and confinement systems. In this connection, illustrated in FIG. 1 is an embodiment of toroidal plasma generation and confinement apparatus 10 which is adapted to be capable of providing a plurality of plasmas within a vacuum chamber which are centered at different locations along the major axis of the apparatus.

The plasma generation and confinement apparatus 10 may be a toroidal fusion reactor for producing high energy neutrons by nuclear reaction occasioned by the fusion of deuterium and tritium nuclei, or may utilize the light hydrogen isotype in provision of a plasma. The apparatus 10 has a large toroidal reaction chamber 12 for plasma generation and confinement. A plasma may be created in the vacuum chamber 12 by an appropriate poloidal field, established by E-coils 14. When the E-coils are energized, they produce a time varying magnetic flux linking the chamber 12. The electric field induced by this flux variation initiates and maintains the toroidal discharge current required for plasma confinement and ohmic heating. F-coils 16a, b control the magnetic configuration and position of a plasma discharge in a predetermined manner. The F-coil system establishes the magnetic boundary conditions for one or more plasmas in the vacuum chamber 12 and may be varied to control the position and other parameters of one or more plasmas in the chamber 12. Also provided around the chamber 12 are toroidal B-coils 18, which establish an azimuthal magnetic field for stable plasma confinement.

The plasma conditions are initiated at relatively low pressures. Hence, the chamber 12 is constantly pumped out by vacuum pumps through ports 30 and conduits 32.

At the high temperatures thus produced in the reaction region containing the plasma, the deuterium and tritium nuclei may undergo fusion, producing helium nuclei and high energy neutrons. These neutrons at energies of about 14 Mev penetrates the first wall 22 and pass into a blanket 24 surrounding the chamber 12. The blanket 24, formed in part of carbon and lithium, is used for extracting the energy from the neutrons, raising the temperature of the blanket 24. Helium gas is circulated through the blanket 24 from a conduit 26. Cool helium is introduced into the conduit 26, and heated helium is withdrawn from a conduit 28. The helium provides a safe, yet effective, heat transfer function, carrying heat from the reactor to an external heat exchanger, where it may perform useful work as in the production of electric energy, thereby being cooled for recirculation through the conduit 26. A radiation shield 34 limits the escape of harmful radiation.

As indicated the method aspects of the present invention involve the merger of two tokamak plasmas having toroidal currents in the same direction. Further in this connection, and for purposes of simplicity of the following disclosure, a somewhat idealized embodiment is initially discussed where the toroidal field strength is large, and nearly ideal magnetic hydrodynamic (MHD) conditions are present, so that the area enclosed by a given flux surface is conserved.

An established plasma 40 is provided in vacuum chamber 12 with a given distribution of flux function (considered positive at the plasma interior and zero at surrounding coils) as shown in FIG. 1.

Subsequently a new plasma 42 is formed adjacent to the first established plasma 40. The new plasma 42 is formed so that the flux function value at the new plasma interior is higher than or comparable to the flux function value at the interior of the first plasma 40.

When these plasmas, 40, 42 are allowed to merge through application of proper guiding fields generated by currents in surrounding coils 16, the new plasma 42 will find its way to the interior of the old plasma. In this regard, it should be noted that the energy of the combined plasma system is minimized when the plasma part with the highest flux function value is placed in the middle of the composite plasma. It should be further noted that such merging requires violation of ideal MHD conditions, but can be accomplished at the hyperbolic axis formed in the configuration when it approaches the state of lowest energy.

The net result of the merger is that the new plasma 42 has been placed in the interior of the initial plasma 40. Since plasma cross-sectional areas tend to be conserved, the old plasma has expanded radially to accommodate the new plasma 42 at its interior. This expansion in time corresponds to a radial flow which again gives rise to an induced electric field, which in turn may drive the bootstrap current. In addition, since the magnetic energy of the system is smaller in the merged state than before, a considerable heating takes place during the merger.

By choosing the flux function value of the "new" plasma 42, one can choose where in the "old" plasma the new plasma mass and its associated energy will be deposited. Thus, for example, for a gas blanket tokamak plasma system, it may be desired to inject the new plasma 42 at the surface of the "old" plasma 40.

A method for carrying out such a plasma merger in the apparatus 10 will now be described.

The initial plasma 40 is provided and contained in the bottom part of the vacuum chamber 12 by means of bottom section coils 16a, which are then held at a flux value of about 0 throughout. The sign of the flux value at the interior of the plasma will be defined to be positive.

The next step is to slowly bias the flow function value of all the top coils 16b to a positive value. Such positive flux biasing is carried out at a rate that is so slow that no breakdown and plasma formation takes place in the top portion of the chamber 12 (prevention of breakdown may be accomplished by other means, for example, means for providing an appropriate magnetic field). Having appropriately biased the top coils 16b to a sufficiently positive value, the flux values of the top coils 16 are brought quickly to zero to accomplish breakdown and plasma formation in the top chamber. The flux value of the newly created plasma 42 is accordingly positive, with a value which is somewhat less than the bias value of the coils 16b before plasma formation. Thus, a plurality of adjacent plasmas having flux values of the same sign are provided.

Subsequently, the flux values of the top coils 16b may be changed in a predetermined manner to create a radial magnetic field that pushes the top plasma 42 downwards into the bottom chamber where the merger with plasma 40 takes place. The process may be repeated for quasi steady-state tokamak operation.

Various types of plasma merging may be accomplished. For example, instead of the axial merger described above, a radial merger may be carried out which may involve the added advantage of an additional heating of the plasma if the "new" plasma is initially created outside the "old" plasma.

Figure 2:
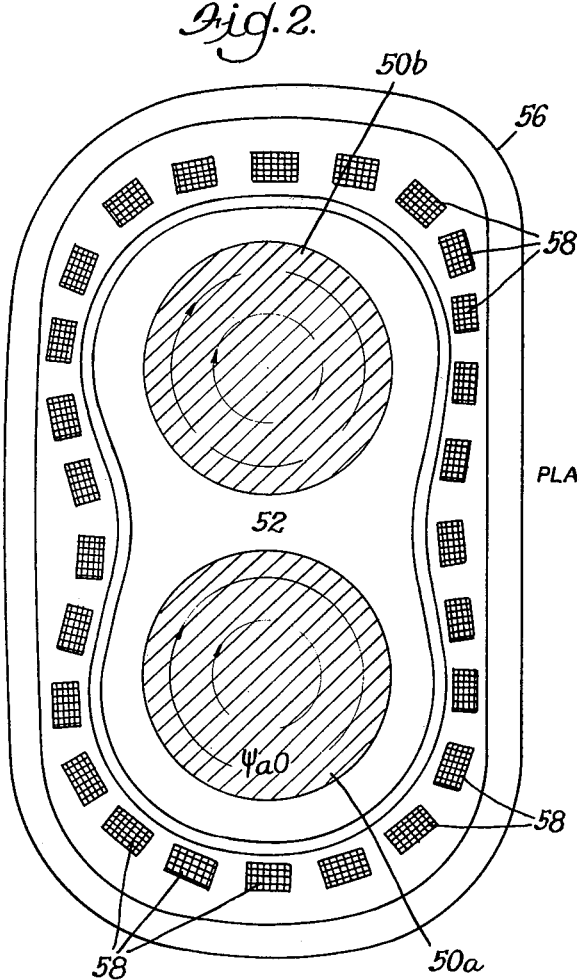
FIGS. 2 and 3 are schematic cross-sectional side views of a plasma chamber illustrating plasma merger steps.
Figure 3:
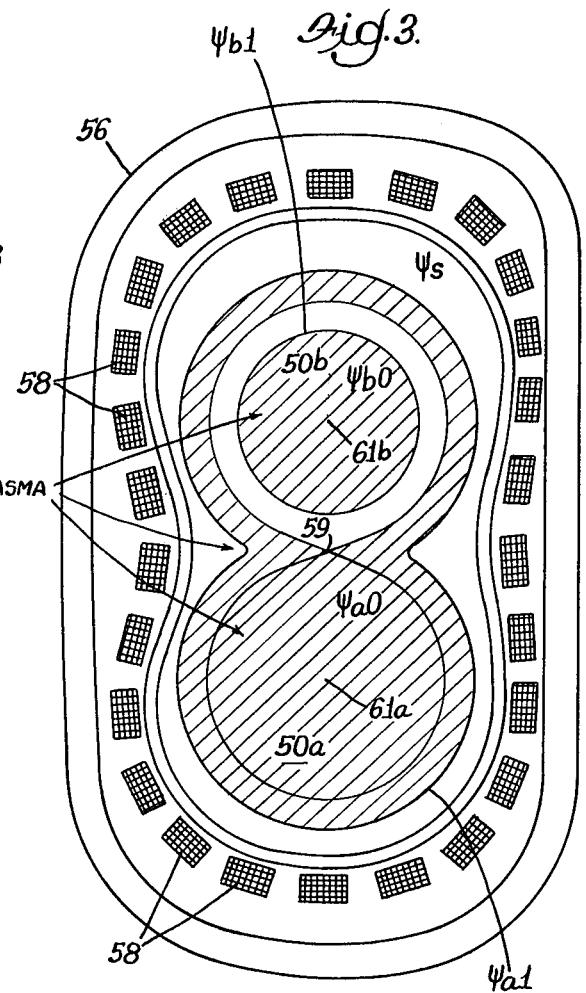

Having generally described an embodiment of the present method, a more detailed discussion will now be set forth with respect to the illustration of FIGS. 2 and 3 for a plasma system which follows substantially ideal MHD except at the separatrix and which has a mass flow velocity which is small compared to the sound speed except at the separatrix. The illustrated plasma system has a straight geometry ($\partial/\partial z = 0$) rather than toroidal gemoetry for purposes of mathematical simplicity although substantially similar results may be obtained in toroidal geometry. The axial magnetic field of the illustrated plasma system of FIGS. 2 and 3 is strong and the plasma retains its symmetry ($\partial/\partial z = 0$) at all times. Accordingly, the area enclosed by a flux surface remains substantially constant and the plasma at any time is in substantial MHD equilibrium.

As illustrated in FIGS. 2 and 3, two tokamak, diffuse plasmas 50a and 50b are separated by a vaccum zone 52, and are located within a vacuum chamber 54 similar to that of FIG. 1 but having a linear rather than toroidal axis encircled by appropriate poloidal "B" coils 56. Similarly, field shaping conductors 58 are provided aligned along the longitudinal axis of the vacuum chamber for flux control within the chamber.

The value of the poloidal flux function ($\psi$) at the plasma surface of plasma 50a may be represented as $\psi_{a1}$, and the corresponding flux value at the plasma surface of plasma 50b may be represented as $\psi_{b1}$. The $\psi$ values at the magnetic axes of the plasmas 50a and 50b may similarly be represented as $\psi_{a0}$ and $\psi_{b0}$, respectively, with the $\psi$ value at the axis of each plasma being greater than the $\psi$ value at a respective plasma surface (i.e., $\psi_{a0} > \psi_{a1}$, $\psi_{b0} > \psi_{b1}$). The cross-sectional area enclosed by a flux surface of plasma 50a is $A_a(\psi)$ and similarly the cross-sectional area enclosed by a flux surface of plasma 50b may be represented as $A_b(\psi)$. The flux surface value $\psi_{a1}$ of plasma 50a is provided at a value which is less than the surface flux value $\psi_{b1}$ of plasma 50b. Furthermore, the plasmas 50b of FIG. 2 have the same current polarities, and may be attracted to each other under the guidance and control of the field shaping coils 58. FIG. 3 is an illustration of the plasma system at one instant of the merging process. Until the plasmas 50a, 50b are fully merged, there is hyperbolic magnetic axis 59 between the two elliptic axes 61a, 61b of the respective plasmas. The $\psi$ value of the hyperbolic axis 59 is $\psi_s$.

When the plasma 50a, 50b are separated by vacuum (i.e., $\psi_s < \psi_{a1}$ and $\psi_s < \psi_{b1}$) and the currents in the poloidal coil system (E-coil) 58 are changed, it will be apparent that the plasma 50a flux surface area $A_a(\psi)$ is conserved for poloidal flux function $\psi$ values between its surface and axis $\psi$ values (i.e., $\psi_{a1} < \psi < \psi_{a0}$). Similarly, the plasma 50b flux surface area $A_b(\psi)$ is conserved for poloidal flux function $\psi$ values between its surface and axis $\psi$ values (i.e., $\psi_{b1} < \psi < \psi_{b0}$).

If the currents in the poloidal coils (E-coils) 58 are programmed to let the plasmas 50a, 50b approach each other, when the surface flux value $\psi_{a1}$ of plasma 50a becomes equal to the $\psi$ value $\psi_s$ at the hyperbolic axis ($\psi_{a1}$ being less than $\psi_{b1}$), the separatrix touches the plasma 50a. Under such circumstances, if plasmas 50a, 50b were ideal MHD plasmas having a plasma resistivity $\eta$ of zero, the separatrix could never enter the plasma 50a. A negative current density (sign convention of the current is that the normal current is positive) would develop at $\psi_{a1}$ in plasma 50a in such a way that the $\psi$ values of the plasmas 50a, 50b are conserved. Such a negative current would, space wise, mostly be located around the hyperbolic axis and thereby provide a repulsive force to prevent the plasmas from getting closer, and thereby prevent the separatrix from entering the plasma 50a.

However, plasmas such as hydrogen plasmas do not have zero resistivity, and this negative current density may be large, so that a small plasma resistivity of a non-ideal plasma will be effective in changing $\psi$ at the plasma surface. The $\psi$ value of plasma with negative current density increases with time, and accordingly, the separatrix will enter plasma 50a in an appropriate time period. If the E-coil 58 current programming is such that merging is encouraged, the negative current density occurs always at the separatrix, and the $\psi$ value of the separatrix, $\psi_s$, increases continually as illustrated in FIG. 3.

Figure 4:
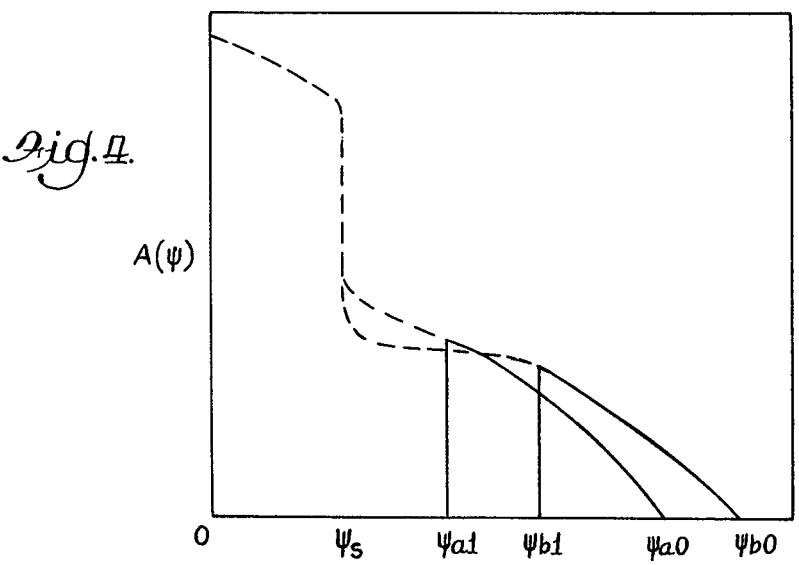
FIG. 4 is a graphical representation of plasma area functions before plasma merger.

FIG. 4 illustrates the functions $A_a(\psi)$ for plasma 50a and $A_b(\psi)$ for plasma 50b before the separatrix enters the plasmas. During this phase, the respective solid parts of the curves shown in FIG. 4 are invariant, while the respective dotted parts of the curves, stemming from the vacuum regions, change with the boundary conditions. At the time that the hyperbolic axis flux value $\psi_s$ reaches the surface flux value $\psi_{a1}$ of plasma 50a, (i.e., when plasma 50a surrounds plasma 50b, the cross-sectional area of the enclosed vacuum region between the two plasmas becomes substantially fixed such that the dotted part of the value of the flux surface area function $A_b(\psi)$ does not substantially change oer the range of $\psi$ value between $\psi_{a1}$ and $\psi_{b1}$ (i.e., $\psi_{a1} < \psi < \psi_{b1}$). Accordingly, at times during the merging process subsequent to the time, the value of $\psi_s$ reaches the value of $\psi_{a1}$ of plasma 50a. The area with $\psi$ values between $\psi$ and $\psi + d\psi$ is substantially a constant, namely $(dA_a/d\psi + dA_b/d\psi) d\psi$ where $\psi$ is greater than $\psi_{a1}$. It will be appreciated that the small change in $A(\psi)$ due to resistive MHD effects taking place near the separatrix does not substantially affect the results of the preceeding discussion.

When the plasma is fully merged, the separatrix vanishes such that the total plasma cross-sectional area function $A(\psi)$ is equal to the sum of $A_a(\psi)$ and $A_b(\psi)$ (noting the previous discussion in respect of the vacuum region around plasma 50b) and therefore with given boundary conditions the plasma equilibrium is determined. In FIG. 4, such complete plasma merger and separatrix disappearance occurs when the separatrix flux value $\psi_s$ becomes equal to the axial flux value $\psi_{a0}$ of the plasma 50a.

There are some gross features of the system of FIGS. 2 through 4 which should be further discussed. In this connection, it should be noted that that portion of plasma 50b having $\psi$ values above $\psi_{a0}$ has not been affected by the merging process. In addition, in the final merged plasma, the resulting plasma with $\psi$ values between $\psi_{b1}$ and $\psi_{a0}$ is a mixture of original plasmas 50a and 50b. Final plasma regions having $\psi$ values between $\psi_{a1}$ and $\psi_{b1}$ are original plasma 50a which is "diluted" with vacuum.

If a limiter or divertor is utilized in the plasma system, the outside of original plasma 50a may have been removed in the merging process, and part of original plasma 50b is located in the center of the final merged plasma. If the plasma 50a, is a hot, partly burned out, dirty fusion plasma and plasma 50b is a relatively cold, clean plasma, it will be appreciated that the merging process accomplishes the task of eliminating the coldest part of the dirty plasma, placing new clean plasma in the center of the resulting combined plasmas, where it may be heated in part by the dirty hot plasma, and thus reach ignition temperature. The net result is therefore a process that helps eliminate the dirty plasma and inject fresh fuel.

Such "psuedo steady-state" operation may be accomplished by providing plasma 50a in a portion of the vacuum chamber surrounded by superconducting E-coils. The new plasma 50b is established in an area of the same vacuum chamber surrounded by normal coils. The plasma 50b may be formed in accordance with conventional practice and allowed to merge with the plasma 50a at the location of the superconducting coils as previously described. Before the current of the merged plasma has decreased too much because of finite plasma resistivity, a new plasma 50b is formed and injected. This process, may in principle, be repeated indefinitely.

During the merging process it will be apparent that ohmic heating occurs at the separatrix by virtue of the large negative current density incident to merger. Viewed from a different perspective, the self-inductance of the plasma increases during the merging process, whereby the poloidal field energy of the combined plasma system is decreased. Part of this energy resulting from the decrease in poloidal field energy may be transferred out of the system through the controlled E-coil circuits, but part of its is deposited in the plasma. Accordingly, when the relative change in the poloidal magnetic field energy is significant, then the relative change in plasma pressure is significant since the kinetic energy of the plasma is of the same order as the poloidal field energy. Moreover, the energy deposited in the plasma pursuant to plasma merger may be relatively insensitive to plasma resistivity.

In addition, since the current density is determined by the total plasma cross-sectional area function $A(\psi)$ and the boundary conditions, any means to affect $A(\psi)$ is a means to affect the current density profile. Thus, because the plasma merger process affects the system cross-sectional area, the process may be utilized to control the current density profile of the system. Having generally described the plasma merging process, further understanding may be obtained by reference to descriptions of the merging of two vortices in a fluid [Lo, Robert K. C. and Lu Ting, Phys. Fluids, 19, 912 (1976)] and to beam stacking in a storage ring [Symon, K. R. and A. M. Sessler, CERN Symp., 1956, 1, pp. 44-58] which references are incoporated herein by reference.

The indicated merger process depends on the existence or provision of the specified plasma behavior conditions, and may fail if such conditions are not provided. For example, instabilities could occur in the vicinity of the separatrix where the large negative current density occurs. If these instabilities merely result in an anomalously high plasma resistivity, the system may still operate as indicated, and as mentioned, the process is not sensitive to the resistivity assumed. If, however, large scale instabilities occur which break the symmetry $(\partial/\partial z = 0)$, then the system may not function as indicated. Accordingly, such instabilities should be avoided.

The plasma merging system in accordance with the present invention may be used to achieve a variety of functions in plasma apparatus.

In this regard, the pulse length of a tokamak discharge is very important from an economical point of view. However, the pulse length may conventionally be limited by plasma contamination due to impurity influx, by burnup of available fuel or by available magnetic flux through the E-coil. Plasma merging systems in accordance with the present invention may be used to compensate for the resistive decay of the flux value of the plasma, and to simultaneously help remove impurities and provide fresh fuel. Pseudo steady-state operation of a tokamak reactor may thereby be realized.

The merging systems depend on plasma transport phenomena. For the optimistic case, it may be assumed that $\tau_\psi$ is less than or about equal to $\gamma_{im}$, where $\tau_{104}$ is the decay time constant of the $\psi$ value of the plasma and $\gamma_{im}$ is the time for impurities to accumulate up to the level at which ignition is impossible. An illustration of operation in this case is shown in FIGS. 5-9, which represent a cross-sectional view of the vacuum chamber 60 of a toroidal plasma system. FIGS. 5 and 6 represent the initial start-up of the plasma system, and FIGS. 7-9 represent a repeatable sequence of steps for pseudo steady-state operation of the plasma system. The toroidal plasma apparatus vacuum chamber 60 has an upper section with $\psi$ value controlled by normally conducting E-coils 62, and an enlarged lower section with $\psi$ value controlled by superconducting E-coils 64.

Turning now to FIG. 5 at the initial start-up of the system, a toroidal plasma 66 of the tokamak type is generated in the top half of the chamber 60 and this plasma is ignited by some form of auxiliary heating such as neutral beam heating or r-f heating in addition to ohmic heating. The ignited plasma is then transferred into the bottom chamber as shown in FIG. 6 by means of a lateral magnetic field produced by properly controlling the $\psi$ values of the E coils 62. Transfer of the ignited plasma itself has the advantage of providing better access for the heating system because less shielding is required in the top chamber, as discussed by Yoshikawa [Princeton Plasma Physics Lab Report MATT 1253 (1976)]. The bottom superconducting E-coils of the system illustrated in FIGS. 5 et seq. are always shorted; i.e., the $\psi$ values of the E-coils are kept zero. The $\psi$ values of the plasma decays because of the finite plasma resistivity. The decay time for the $\psi$ value of the plasma may be represented as $$\tau_\psi = \frac{1}{10} \left| \frac{1}{\psi_c} \frac{\partial \psi_c}{\partial t} \right|$$

where $\psi_c$ is the $\psi$ value at the center of the plasma. Using Spitzer resistivity $\eta$, [Spitzer, L., Jr., Physics of Fully Ionized Gases, Interscience (1962) p. 139], and assuming a conventional current profile, we find $$\tau_\psi \sim 4 \times 10^{-2} \mu_0 a^2 / \eta \text{ sec}$$

where a is the plasma radius. Substituting appropriately representative reactor parameters ($T_e \sim 10$ KeV, $a \sim 2$ m) into Equation 1 we find $\tau_{104} \sim 200$ sec.

At a time t equal to about $\tau_\psi$ after the plasma is ignited, a new plasma 68 is created in the top chamber as shown in FIG. 7, and it is merged with the old plasma 66 in the superconducting bottom chamber as shown in FIG. 8. The new plasma may be formed as previously discussed in connection with the embodiments of FIGS. 1-3, and in this connection, the $\psi$ value of the upper E-coil 62 is first raised to value higher than the central $\psi$ value of the plasma to be formed. This $\psi$ change is made sufficiently slowly so that no plasma breakdown takes place. By reducing the ψ value of the top E-coil 62 rapidly, a new tokamak plasma is formed as shown in FIG. 7. The new plasma 68 is then merged with the old ignited plasma 66 by an appropriate guiding field as shown in FIG. 8. The central part of the new plasma, with ψ value higher than at the center of the old plasma, is located inside the old plasma and the rest of the new plasma is combined with the entire old plasma, as shown in FIG. 9. The process of FIGS. 7, 8 and 9 may then be repeated.

In this way the ψ value of the bottom plasma is maintained in pseudo steady-state condition, and simultaneously the impurity concentration is reduced. After merging, the plasma temperature and density will change by an amount that depends upon the temperature and density of the new plasma; it may be possible to satisfy the ignition condition even if the temperature of the new plasma is very low.

In FIG. 10, the path in nT space in the above operation of FIGS. 5 through 9 is shown, the shaded area representing the ignition domain. Initially, by an appropriate form of auxiliary heating as previously described, the plasma is brought to point "A" on the ignition line. The plasma ignites and it may approach without external heating the β limit "B". During merging, the plasma drops to point "C" still in the ignition domain and it therefore returns to point "B". In this mode of operation, the new plasma does not have to be brought to ignition by external heating. This process can be repeated and thus pseudo steady-state operation can be realized.

The process is only commercially useful if the power required to make the new cold plasma periodically is much smaller than the fusion output power. The ignition condition may be represented as $$P_f/5 > (3nT/\tau_E),$$

where $P_f$ is the fusion power density. The power required to make a new plasma periodically with time interval $\Delta t$ is approximately equal to $$(B_p^2/2\mu) \cdot (V/\Delta t)$$

(where V is volume of the E-coil chamber) because most of the energy of the newly created tokamak plasma in the top chamber is poloidal magnetic energy. The ratio (γ) of fusion power to the power for making a new plasma periodically is accordingly represented as follows:

$$\gamma \sim (15nT/\tau_E)|B_p^2/2\mu|\Delta t = 7.5 \, \beta_p \cdot (\Delta t/\tau_E).$$

For economical Tokamak operation, γ must be greater than, say, 10. In the reactor study [Davis, J. W. and G. L. Kulcinski, Nuc. Fusion, 16 (1976) 355], $\tau_E$ is assumed to be in the range of from about 3 seconds to about 5 seconds and $\beta_p$ is 2. Since the repetition time (Δt) of the system of FIGS. 4 through 0 generally corresponds to the ψ decay time $t_\psi$ of about 200 seconds, it may be seen that γ is on the order of about 500. Thus, the power requirement for the periodic merging is small.

In plasma systems with a more conservative operating parameters, the impurity contamination limits the pulse length of the discharge, and an appropriate divertor should be utilized to reduce or control the impurity problem. In any event, particularly if the impurities are distributed uniformly, the merging of a pure plasma internally of the impulse plasma will tend to eliminate the impurity and maintain its concentration within an acceptable limit.

For plasma systems in which the impurity concentration limits the pulse length of the discharge, the operation is similar to that for the system of FIGS. 4–8 except for the repetition time for merging (Δt). The repetition time (Δt) of such systems should be less than the impurity contamination time ($\tau_{im}$) such that before the impurity concentration reaches a critical level, the old ignited plasma is merged with the new pure tokamak plasma for example with almost the same plasma density. After merging, the merged plasma density does not substantially change, but the impurity concentration becomes almost half that before merging because the plasma volume doubles by merging.

Before the next merging sequence, the outer part of merged plasma should be removed in order to avoid the continuous increase of plasma volume. This "scrape-off" process eliminates the impurity in the outer part and therefore perhaps in combination with other impurity control methods and apparatus such as divertor systems, tends to keep the concentration below the critical level. Such outer plasma removal may be accomplished by the use of divertors.

Figure 11:
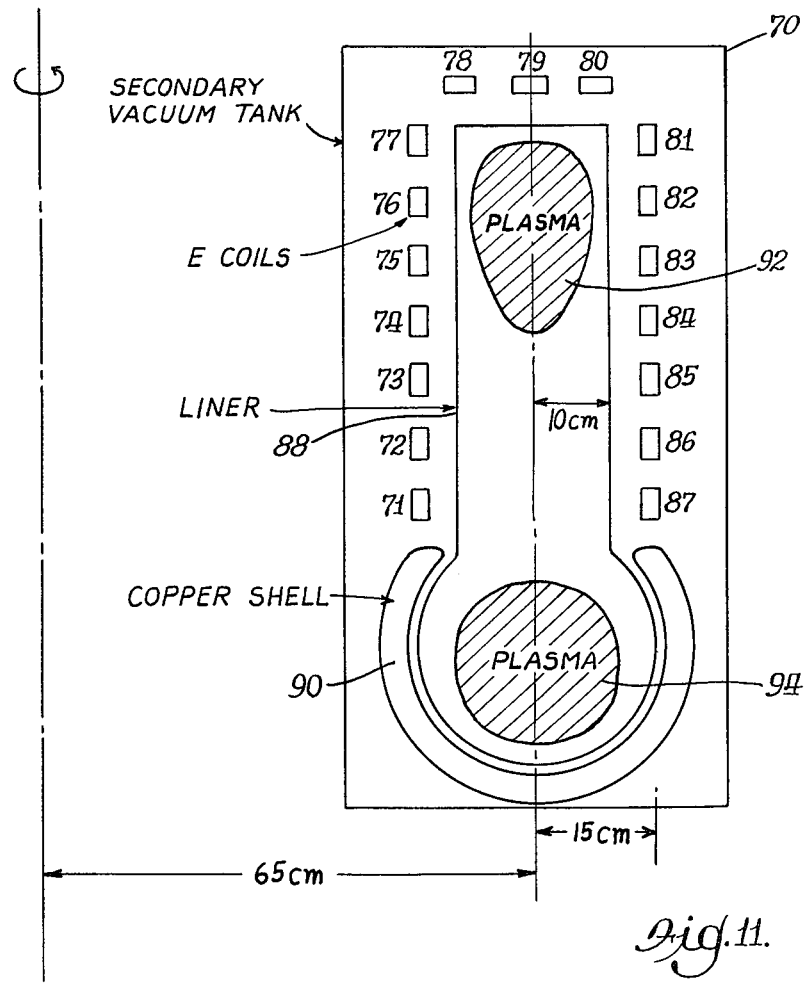
FIG. 11 is a cross-sectional view of another embodiment of a toroidal plasma system adapted for practice of the present invention.

Still another embodiment is shown in FIG. 11, which is a cross-sectional view of a toroidal plasma system comprising a vacuum chamber 70, field shaping E-coils 71–87, a liner 88, and a copper shell 90. The E-coils 71–87 control the radial magnetic field strength in an upper rectangular plasma zone while the copper shell 90 surrounds a toroidally shaped lower plasma zone. Appropriate B-coils (not shown) provide a suitable toroidal field with a strength, for example, of about 10 kilogauss. E-coils 71–87 provide for plasma formation (e.g., "new" plasma 92) in the upper rectangular zone, while the copper shell 90 provides for radial field control in the lower plasma zone (e.g., for "old" plasma 94).

Toroidal plasmas may be formed, in the upper chamber, in accordance with conventional technology, in about 3–5 milliseconds. Therefore, plasmas are provided which are sufficiently hot and large to last longer than 3–5 msec (with zero external electric field) in order to provide sufficient time for two successively formed plasmas to merge. In this connection, it is pointed out that the "lifetime" τ of a toroidal plasma given by $\mu_0 \sigma r^2$ where σ is the plasma conductivity and r is the plasma radius. For typical operating parameters, for example, the Spitzer conductivity at 50 eV and lifetime τ of 10 milliseconds, radial dimension of 15 centimeters, which is similar to those of Doublet IIA.

The copper shell 90 forms the "holding chamber" for plasma 94 and has no gaps or flux links such that its ψ value is substantially zero. The wall thickness of the illustrated copper shell is 1 in. to make it behave as a good conductor for a time on the order of about 30 msec.

The upper 9 E-coils 75–83 all have 36 conductor turns (a number close to the number of turns for Doublet IIA). The remaining lower 4 pairs of E-coils 71–74, 84–87 have number of turns such that if all E-coils are coupled in parallel, the radial magnetic field strength at E-coils 1–4 is about constant, as follows:

| E COIL NO. | 75–83 | 74,84 | 73,85 | 72,86 | 71,87 |
| --- | --- | --- | --- | --- | --- |

| -continued | | | | | |
|---|---|---|---|---|---|
| TURNS | 36 | 45 | 60 | 90 | 180 |

Plasma 92 is formed in the zone defined by E-coils 75–83. In this process, all E-coils are coupled in parallel and first back biased to $\psi_o$ for coils 75–83 (i.e., 4/5 $\psi_o$ for coils 74, 84, 3/5 $\psi_o$ for coils 73, 85 etc). During this back bias, no break down is allowed as previously described. $\psi_o$ is now quickly brought to zero (e.g., in about 3 milliseconds) and plasma is formed, with a maximum $\psi$ value of the newly formed plasma of the order of about $\psi_o/3$.

With operating parameters such that the upper E-coils 75, 83 form a relatively circular cross-section E-coil cage with a radius of 15 cm, that the newly formed plasma 92 has a circular cross-section with radius 10 cm, that the current density is uniform with q=2.5 and that the toroidal field strength is 10 kG, the following plasma conditions are provided:

| | |
|---|---|
| Plasma current | $I_{po} = 30$ kA |
| $\psi$ at plasma surface | $\psi_1 = 1.6 \times 10^{-3}$ V sec |
| $\psi$ at plasma center | $\psi_2 = 3.5 \times 10^{-3}$ V sec |
| | $\psi_o = 10.5 \times 10^{-3}$ V sec |
| Total back bias amp-turns in coils 75–83 | $I_{BB} N_o = 55$ kA |
| Total back bias current | $I_{BB} = 1.5$ kA |
| Radial back bias magnetic field E-coils 71–75, 83–87 | 460 G |

When $\psi$ on upper coils 75–83 is brought to zero (or slightly negative) the plasma will "slide" into the lower zone defined by the copper shell 90. The plasma current of the axially downwardly displaced plasma is almost the same (discounting resistivity effects) names 30 kA, the plasma radius is still about 10 cm, and the $\psi$ values at the surface and the plasma center are also substantially the same as those given above for the newly formed plasma. Of course, however, as time goes on, the plasma current will decay, q will rise and the plasma may expand.

At a proper time, the E-coils are back biased again, without pulling the existing plasma out of the copper shell region such as by adjustment of the number of turns in coils 71, 87 or change of the winding direction. During the back bias, plasma formation in the E-coil region may be injected after the back biasing so that plasma formation can take place when the back biasing is removed so that a second plasma 92 is formed and driven downwards and made to merge with the first plasma 94.

Figure 12:
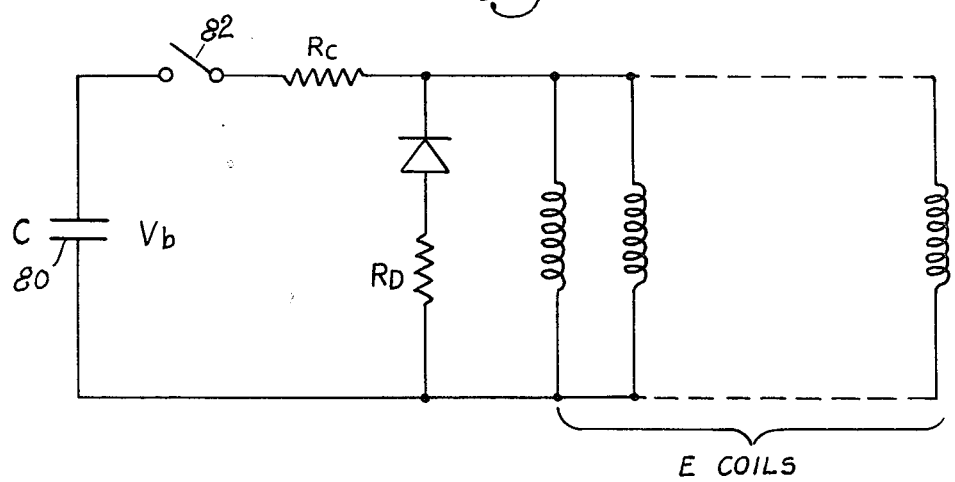
FIG. 12 is a schematic diagram of a circuit to drive the E-coils of the apparatus of FIG. 11.

A simple circuit to drive the E-coils is shown in FIG. 12. A large capacitor 80 is initially charged to a voltage $V_o$. Switch 82 is closed and the E-coils are back biased. The switch 82 opens and the back bias current flows through $R_D$ and decays.

The rise time for the back bias current $\tau_c$ may be represented as:

$$(L_E/R_c) = \tau_c; \quad V_o = R_c I_{BB}$$

where $L_E$ is the inductance of all E coils in parallel. The decay time of the back bias $\tau_D$ may be represented as:

$$\tau_D = (L_E/R_D)$$

The capacitor should be large enough that the voltage does not drop much in a desired number of plasma formation cycles (e.g., four cycles), i.e., $$C >> 4\tau_c I_{BB}/V_o$$

From these equations it can be determined ($L_E \sim 1.5 \times 10^{-3}$) for $\tau_c = 3 \times 10^{-3}$ seconds. $\tau_D = 10^{-3}$ seconds and $I_{BB} = 1.5 \times 10^{-3}$ amp, $V_o = 800$ V; $R_c = 0.5$ $\Omega$; $R_D = 1.5$ $\Omega$; $C >> 22$ mF, which are parameters within conventional plasma confinement technology.

For plasma systems in which the impurity concentrates in the plasma center as predicted in neo-classical theory [Hinton, F. L. and T. B. Moore, Nuc. Fusion, 14 (1974) 639], some other methods and apparatus such as one using an inverted density gradient [Furth, H. P. and D. L. Jassby, Bull. Am. Phys. Soc., 19 (1974); Jassby, D. L., in Symposium on Plasma Heating in Toroidal Verices (Proc. Varenna, 1974) 259], should be utilized with the present plasma merging systems in order to extract the impurities.

It will thus be appreciated that the present plasma merging systems may be utilized to solve plasma refueling problems because the new pure plasma is combined with the old ignited plasma whose density is decaying.

For plasmas in which the impurity concentration limits the pulse length, the merging takes place before the plasma $\psi$ value decays as indicated previously. Such continuous merging results in the accumulation of flux surfaces at the outer part of the plasma (i.e., skin current). However, nonclassical mechanisms such as magnetic braiding, [Stix, T. H., Phys. Rev. Lett., 30 (1973) 833] and anomalous viscosity or resistivity [Liu, C. S., M. N. Rosenbluth and C. W. Horton, Jr., Phys. Rev. Lett, 27 (1972) 1489], are likely to smooth out the current and the $\psi$ profile.

As indicated, merging of plasmas in accordance with the present invention may be utilized to provide rapid plasma heating. During the merging process, the magnetic energy decreases by a fraction of the total poloidal magnetic energy. By appropriate design, most of this magnetic energy decrease could be converted to thermal energy of the plasma and $\beta_p$ could increase by a fraction of unity. This very significant amount of heating is independent of the plasma temperature.

Particularly in impurity limited systems, it may be difficult to repeat the merging process within the energy confinement time. To supplement the above heating, additional methods for providing and merging new plasmas may be utilized.

In this connection for example, an ion beam may be built up in the top chamber of the plasma confinement apparatus by neutral beam injection. To build up the ion beam efficiently, this appropriate tokamak system should have low density, which makes the beam slow-down time ($\tau_s$) longer. (e.g., $\tau_s = 1$ second when $n = 10^{13}$ cm$^{-3}$ and Te = 5 keV).

The beam-produced Tokamak plasma thereby produced may be merged with a main high density Tokamak plasma in the bottom chamber. Because of the high density of the main plasma, the beam is rapidly thermalized and heats the plasma quickly.

Such a neutral beam heating system enabled by utilization of the merging system of the present invention, has several important features and advantages over simple conventional neutral beam heating. First, it allows a rapid heating (within 0.1 sec) which comes from the merging process itself as well as the thermalization of the ion beam. Therefore, the combined plasma temperatures rises quickly, regardless of the energy confinement time such as in the range of from about 1 second to about 10 seconds. The temperature and density after merging may be provided in the ignition domain. Because the neutral beam is injected into a low density plasma, there is no problem of beam penetration as could be the case for beam injection with the denser plasma. Furthermore, such a system provides a better access for the neutral beam heating system because of reduction of shielding and other requirements for the upper chamber, as previously discussed.

Moreover, the beam injection-plasma merging methods may be combined with adiabatic compression techniques [Furth, H. P. and S. Yoshikawa, Phys. Fluids, 13 (1970) 2593] to become even more powerful.

In addition to applications in plasma systems operable in the ignition regime and fusion power systems, plasma merging methods and apparatus have various other applications. For example, plasma merging systems may be used to control the plasma current profile and plasma itself at the plasma boundary, by choosing the proper relative $\psi$ value of two tokamak plasmas. Plasma merging systems may also be utilized in plasma systems based on the flux conserving tokamak concept [Clarke, J. F. and D. J. Sigman, Phys. Rev. Lett., 38 (1977) 70] which requires rapid plasma heating.

Accordingly, in accordance with the present invention, it will be recognized that merging of two Tokamak plasmas as disclosed herein is a process with several features which may be advantageously utilized in plasma generation and confinement system such as tokamak fusion reactors. In the merging process, the topology of the magnetic configuration changes with the assumption of conservation of toroidal and poloidal fluxes being utilizable to make predictions about the properties of the plasma resulting from the merging. Appropriate plasma merging systems may be applied to the key problems of tokamak reactors such as pseudo steady-state operation and plasma heating.

It will be appreciated that while the present invention has been described with reference to specific embodiments of the invention, that various modifications and adaptations will be apparent based on the present disclosure, and that such modifications and adaptations are intended to be within the spirit and scope of the invention as set forth in the following claims.

What is claimed is:

1. In a method for generating and confining toroidal plasmas in which a first toroidal plasma is provided in a vacuum chamber in a toroidal plasma confining magnetic field, an electric current is generated in said first plasma in the direction of the minor toroidal axis of the plasma to provide a poloidal magnetic field for plasma confinement, the improvement comprising the steps of providing a second toroidal magnetically confined plasma in the vacuum chamber adjacent said first plasma and having the same major toroidal axis as said first toroidal plasma but displaced from said first toroidal plasma in a direction along the major toroidal axis of both said first toroidal plasma and said second toroidal plasma, said second plasma being magnetically confined by the same toroidal magnetic field as said first plasma, generating an electric current in said second plasma in the direction of the minor toroidal axis of the second toroidal plasma, having a current polarity the same as that of said first toroidal plasma, and merging said first plasma and said second plasma to provide a combined plasma confined within the same poloidal and toroidal magnetic fields.

2. A method in accordance with claim 1 wherein said merger is accomplished by depositing said second plasma in a central zone of said first plasma and wherein an outer portion of said combined plasma is removed from said vacuum chamber.

3. A method in accordance with claim 1 wherein a third plasma is generated in said vacuum chamber adjacent said combined plasma and wherein said third plasma is merged with said combined plasma by depositing said third plasma in a central zone of said combined plasma and wherein an outer portion of said combined plasma is removed from said vacuum chamber.

4. A method in accordance with claim 1 wherein a succession of new plasmas are formed adjacent said combined plasma and each successively formed new plasma is subsequently merged with said combined plasma by depositing said new plasma in a central zone of said combined plasma, and wherein an outer portion of said combined plasma is removed from said vacuum chamber.

5. A method in accordance with claim 1 wherein said second plasma is additionaly heated by neutral beam injection.

6. A method in accordance with claim 1 wherein plasma heating is provided by said merger.

7. A method in accordance with claim 1 wherein plasma purity is controlled by removal of the outer portion of the combined plasma.

* * * * *

UNITED STATES PATENT AND TRADEMARK OFFICE
CERTIFICATE OF CORRECTION

PATENT NO. : 4,274,919

DATED : June 23, 1981

INVENTOR(S) : Torkil Jensen, et al.

It is certified that error appears in the above—identified patent and that said Letters Patent is hereby corrected as shown below:

Column 8, line 58, "$\tau_{104}$" should be --$\tau_\psi$--.

Signed and Sealed this

Nineteenth Day of January 1982

[SEAL]

Attest:

Attesting Officer

GERALD J. MOSSINGHOFF

Commissioner of Patents and Trademarks